Oct. 21, 1952  V. VÄISÄLÄ  2,614,293

METHOD OF MAKING BALLOONS

Filed Nov. 22, 1949

Inventor
Vilho Väisälä

UNITED STATES PATENT OFFICE 2,614,293

METHOD OF MAKING BALLOONS

Vilho Väisälä, Helsinki, Finland

Application November 22, 1949, Serial No. 128,751
In Finland January 18, 1945

9 Claims. (Cl. 18—58.7)

The invention relates specifically to a novel method which may be advantageously employed in the making of balloons.

It is the object of the invention to provide an improved method for making balloons as great as desired by the dipping process while preventing the forms becoming too heavy and difficult to handle.

In the making of balloons by the dipping process it has heretofore been customary to immerse balloon-shaped-forms into a rubber dispersion containing vulcanizing agents after which the fluid layer retained on the forms is dried, vulcanized in ordinary manner and then removed from the form.

In making large balloons specifically for meteorological purposes the process described is disadvantageous. The largest balloons for the purpose described measure one meter or more in diameter when not inflated and consequently the forms for such balloons are heavy and difficult to handle as the forms must be repeatedly turned up and down for setting the rubber dispersion on the surfaces thereof.

For this reason such large sized balloons are made at present by gluing several rubber pieces together. However the durability of such a balloon made by gluing and having seams cannot be compared with that of a quite seamless balloon made according to the dipping process.

The invention is chiefly characterized in that a funnel-shaped form provided with air passage is dipped into a rubber dispersion, after which the rubber layer coagulated at the neck of the form is tied air tight and the rubber layer deposited on the interior side of the form is drawn out of the form and the open end of the thus obtained funnel-shaped rubber piece is closed and air introduced into the funnel through the air inlet, whereby the rubber layer coagulated on the exterior side of the form loosens from the form and together with the rubber layer drawn out of the interior side of the form constitutes a balloon, which is dried, after which the form is removed and the balloon vulcanized in customary manner. In this way it is possible to make extremely thin balloons otherwise difficult to manufacture.

The invention will be more particularly described with reference to the accompanying drawing which illustrates a preferred embodiment of the invention and in which.

Figure 1:
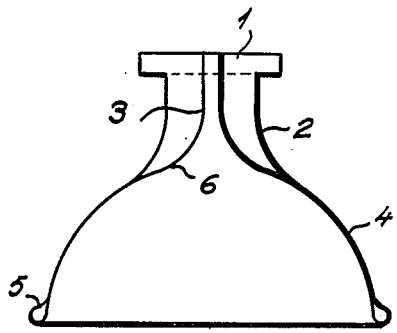
Fig. 1 is a vertical section of the form taken along its central axis.

The form is made of metal plate, pasteboard or other suitable material and provided with a coating of varnish or enamel for preventing corrosion of the form. The numeral 1 designates the base of the form used for keeping the form in place during immersion, 2 the neck of the form, 4 the walls and 5 the rounded-off edges of the form. From the interior 6 of the form there proceeds an air passage 3 through the neck 2 and the base 1.

Figure 2:
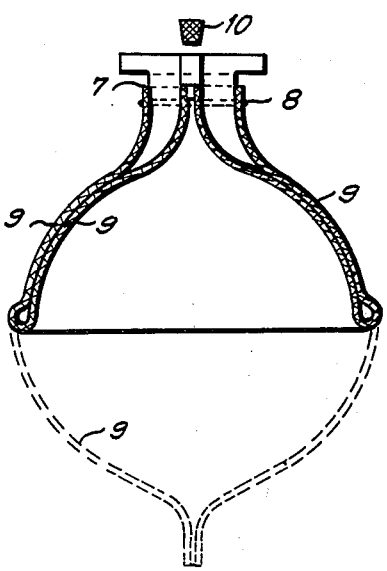
Fig. 2 is a vertical section of the form immersed in rubber dispersion, the form being surrounded by a gel-like rubber layer.
Figure 3:
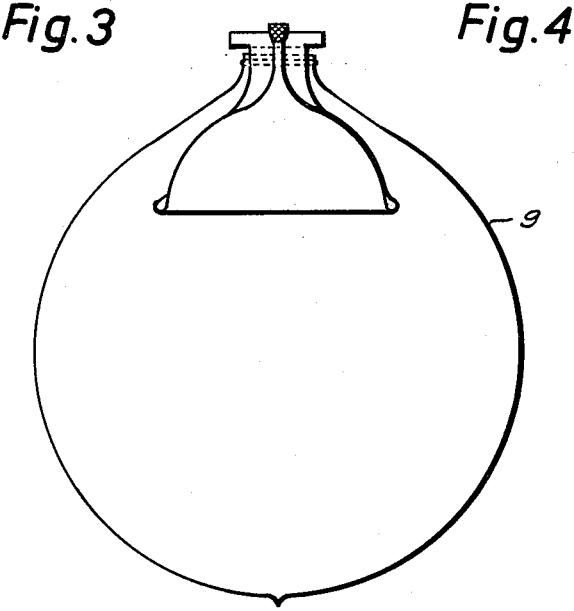
Fig. 3 illustrates an inflated rubber balloon in vertical section, the form still remaining within the balloon.

In making balloons the form is dipped into a rubber dispersion so that a layer 9 coagulates on the form up to a point adjacent the base and indicated at 7, as shown in Fig. 2. After the form has been immersed the rubber layer is tied air tight to the neck 2, e. g., with a rubber band 8. Subsequently the rubber layer on the interior side 6 of the form is pulled out, as shown by dash lines in Fig. 2, and the short rubber tube in the air passage 3 is drawn wrong side up out of the form into the position shown with dash lines, and the undermost open end is tied air tight. Then air is blown into the funnel through the air passage 3, whereby the rubber layer coagulated on the outer surface of the form disengages itself therefrom and together with the rubber layer pulled out from the interior, forms a balloon. When the balloon has attained the desired size the air is prevented from flowing out by stoppering the mouth of the air passage 3, e. g., with a rubber stopper 10.

Then the balloon is hung up to dry and when the rubber layer is completely dry the balloon is talced on the outside and on the inside also by blowing in talc through the air passage, after which the form is removed by undoing the band 8 and stretching the neck opening of the balloon sufficiently. Ultimately the balloon is vulcanized in customary manner, e. g., in warm air.

Figure 4:
Fig. 4 illustrates a minor nozzle which is glued fast to the balloon.

While this method presupposes that the neck of the form and in consequence thereof also the neck opening of the balloon must be made larger than normal as regards diameter, in order to permit withdrawal of the form from the balloon, the neck opening can be diminished by employing a nozzle made by immersing a special form, glued over the neck of the balloon and shown in Fig. 4 and is clear without further explanations.

It will be obvious that the shape of the funnel-like form can be modified at will within the scope and spirit of this invention. In like manner also the rubber tube formed in the air passage 3 can be closed air tight in the passage already and be left within the balloon.

I claim:

1. A method of manufacturing a hollow article having a neck-shaped tubular portion comprising in combination, the steps of producing a coherent film on the outer and inner surfaces of a hollow deposition form having a neck-shaped portion containing an air passage by immersing said deposition form into a liquid substance adapted to form an elastic solidified film when dried; closing airtightly the opening in said film formed on the nozzle of said air passage; airtightly attaching the neck-shaped tubular portion of said film formed on the outside of said neck-shaped portion of said deposition form to the same; inflating said film so as to increase its size whereby said film forming a deposit on the surface of said deposition form is separated from it; drying said thus inflated film so as to form an inflated hollow elastic article having an elastically stretchable neck-shaped tubular portion; and removing said deposition form through the elastically stretchable neck-shaped tubular portion of said article.

2. A method of manufacturing a hollow spherical ball shaped article having a neck-shaped tubular portion comprising in combination the steps of producing a coherent film on the outer and inner surfaces of a hollow substantially hemispherical deposition form by immersing said deposition form into a liquid substance adapted to form an elastic solidified film when dried, said deposition form being provided with a neck-shaped portion containing an air passage; airtightly closing the opening in said film formed on the nozzle of said air passage; airtightly attaching the neck-shaped tubular portion of said film formed on the outside of said neck-shaped portion of said deposition form to the same; inflating said coherent film so as to increase its size whereby said film forming a deposit on the surface of said deposition form is separated from said deposition form, and a hollow spherical film so as to form an inflated hollow elastic article having an elastically stretchable neck-shaped tubular portion is formed; drying said thus inflated ball; and removing said deposition form through the elastically stretchable neck-shaped tubular portion of said article.

3. A method of manufacturing a hollow spherical ball shaped article having a neck-shaped tubular portion comprising in combination the steps of producing a coherent film on the outer and inner surfaces of a hollow substantially hemispherical deposition form by immersing said deposition form into a liquid solution of rubber, said deposition form being provided with a neck-shaped portion containing an air passage; airtightly closing the opening in said film formed on the nozzle of said air passage; airtightly attaching the neck-shaped tubular portion of said film formed on the outside of said neck-shaped portion of said deposition form to the same; inflating said coherent film so as to increase its size whereby said film forming a deposit on the surface of said deposition form is separated from said deposition form, and a hollow spherical ball is formed; drying said thus inflated film so as to form an inflated hollow elastic article having an elastically stretchable neck-shaped tubular portion; and removing said deposition form through the elastically stretchable neck-shaped tubular portion of said hollow article.

4. A method of manufacturing balloons having a neck-shaped tubular portion, comprising in combination the steps of producing a coherent film on the outer and inner surfaces of the hollow substantially hemispherical deposition form by immersing said deposition form into a liquid substance adapted to form an elastic solidified film when dried, said deposition form being provided with a neck-shaped portion containing an air passage; pulling out the substantially hemispherical film formed on the inner surface of said deposition form, said pulled out substantially hemispherical film forming together with the substantially hemispherical film formed on the outside of said deposition form a hollow substantially spherical article having neck-shaped tubular portions of different size on opposite sides; airtightly closing the narrower neck-shaped tubular portion formed in the nozzle of said air passage; airtightly attaching the larger neck-shaped tubular portion of the film formed on the outside of said neck-shaped portion of said deposition form to the same; inflating said hollow article so as to increase its size, whereby the hemispherical part of said article forming a film on the outer surface of said deposition form is separated from it; drying the thus inflated film so as to form an inflated hollow elastic balloon having an elastically stretchable neck-shaped tubular portion; and removing said deposition form through the elastically stretched larger neck-shaped tubular portion of said balloon.

5. A method of manufacturing balloons having a neck-shaped tubular portion, comprising in combination the steps of producing a coherent film on the outer and inner surfaces of the hollow substantially hemispherical deposition form by immersing said deposition form into a liquid solution of rubber, said deposition form being provided with a neck-shaped portion containing an air passage; pulling out the substantially hemispherical film formed on the inner surface of said deposition form, said pulled out substantially hemispherical film forming together with the substantially hemispherical film formed on the outside of said deposition form a hollow substantially spherical article having neck-shaped tubular portions of different size on opposite sides; airtightly closing the narrower neck-shaped tubular portion formed in the nozzle of said air passage; airtightly attaching the large neck-shaped tubular portion of the film formed on the outside of said neck-shaped portion of said deposition form to the same; inflating said hollow article so as to increase its size, whereby the hemispherical part of said article forming a film on the outer surface of said deposition form is separated from it; drying the thus inflated film so as to form an inflated hollow elastic balloon having an elastically stretchable neck-shaped tubular portion; and removing said deposition form through the elastically stretched larger neck-shaped tubular portion of said balloon.

6. A method of manufacturing balloons having a neck-shaped tubular portion, comprising in combination the steps of producing a coherent film on the outer and inner surfaces of the hollow substantially hemispherical deposition form by immersing said deposition form into a liquid solution of rubber, said deposition from being provided with a neck-shaped portion containing an air passage; pulling out the substantially hemispherical film formed on the inner surface of said deposition form, said pulled out substantially hemispherical film forming together with the substantially hemispherical film formed on the outside of said deposition form a hollow substantially spherical article having neck-shaped tubular portions of different size on opposite sides; airtightly closing the narrower neck-shaped tubular portion formed in the nozzle of said air passage; airtightly attaching the larger neck-shaped tubular portion of the film formed on the outside of said neck-shaped portion of said deposition form to the same; inflating said hollow article so as to increase its size, whereby the hemispherical part of said article forming a film on the outer surface of said deposition form is separated from it; drying the thus inflated film so as to form an inflated hollow elastic balloon having an elastically stretchable neck-shaped tubular portion; removing said deposition form through the elastically stretchable larger neck-shaped tubular portion of said balloon; and vulcanizing said balloon.

7. A method of manufacturing balloons having a neck-shaped tubular portion, comprising in combination the steps of producing a coherent film on the outer and inner surfaces of the hollow substantially hemispherical deposition form by immersing said deposition form into a liquid substance adapted to form an elastic solidified film when dried, said deposition form being provided with a neck-shaped portion containing an air passage; pulling out the substantially hemispherical film formed on the inner surface of said deposition form, said pulled out substantially hemispherical film forming together with the substantially hemispherical film formed on the outside of said deposition form a hollow substantially spherical article having neck-shaped tubular portions of different size on opposite sides; airtightly closing the narrower neck-shaped tubular portion formed in the nozzle of said air passage; airtightly attaching the larger neck-shaped tubular portion of the film formed on the outside of said neck-shaped portion of said deposition form to the same; inflating said hollow article so as to increase its size, whereby the hemispherical part of said article forming a film on the outer surface of said deposition form is separated from it; drying the thus inflated film so as to form an inflated hollow elastic balloon having an elastically stretchable neck-shaped tubular portion; removing said deposition form through the elastically stretchable larger neck-shaped tubular portion of said balloon; and gluing a funnel-shaped member to said neck-shaped tubular portion of said balloon, said funnel-shaped member being adapted to reduce the size of the opening in said neck-shaped tubular portion of said balloon.

8. Method of manufacturing a hollow inflated article comprising in combination the steps of producing on the outer and inner faces of a hollow deposition form which is open on one side and provided with a relatively small opening spaced from said open side of said deposition form a coherent film of a liquid substance adapted to form an elastic solidified film when dried composed of an inner film portion adhering to said inner face of said deposition form and an outer film portion adhering to said outer face of said deposition form and provided with an opening corresponding to said relatively small opening in said deposition form, said inner and outer film portions being integral along the edge of said deposition form encircling the open side thereof; introducing through said opening in said outer film portion and said relatively small opening in said deposition form a fluid medium between the inner face of said deposition form and said inner film portion so as to force said inner film portion to become detached from said inner face of said deposition form and to project outward from said deposition form through said open side of the same and continuing such introduction of a fluid medium so as to inflate the article formed by said film portions until also said outer film portion adhering to said outer face of said deposition form becomes detached from the same; and removing the deposition form from the thus inflated article through said opening in said outer film portion.

9. Method of manufacturing a hollow inflated article comprising in combination the steps of producing on the outer and inner faces of a hollow deposition form which is open on one side and provided on the opposite side with a relatively small opening a coherent film of a liquid substance adapted to form an elastic solidified film when dried composed of an inner film portion adhering to said inner face of said deposition form and an outer film portion adhering to said outer face of said deposition form, one of said film portions provided with an opening corresponding to said relatively small opening in said deposition form, and said inner and outer film portions being integral along the edge of said deposition form encircling the open side thereof; introducing through said opening in said film portion and said relatively small opening in said deposition form a fluid medium between said film portions and said deposition form so as to force said inner film portion to become detached from said inner face of said deposition form and to project outward from said deposition form through said open side of the same and continuing such introduction of a fluid medium so as to inflate the article formed by said film portion until also said outer film portion adhering to said outer face of said deposition form becomes detached from the same; and removing the deposition form from the thus inflated article through said opening in said outer film portion.

VILHO VÄISÄLÄ.

REFERENCES CITED

The following references are of record in the file of this patent:

UNITED STATES PATENTS

| Number | Name | Date |
| --- | --- | --- |
| 212,939 | Ingram | Mar. 3, 1879 |
| 1,994,317 | Linscott | Mar. 12, 1935 |
| 2,241,385 | Beal | May 13, 1941 |
| 2,254,263 | Bratring | Sept. 2, 1941 |
| 2,378,702 | Habib | June 19, 1945 |